Dec. 22, 1959   J. W. WESTPHALL   2,917,908
TRANSMISSION TURNING TOOL
Filed April 18, 1958   2 Sheets-Sheet 1
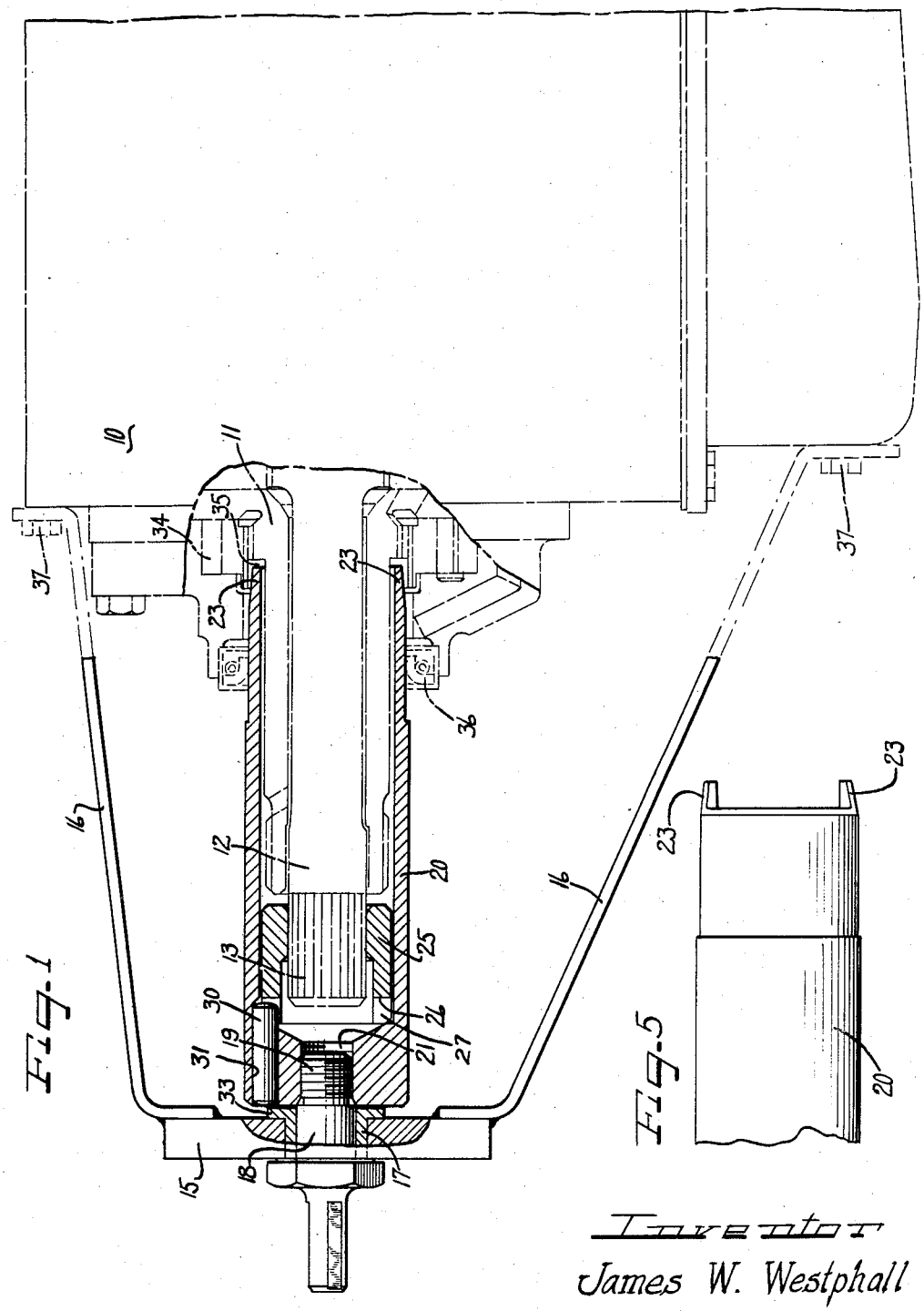
Inventor
James W. Westphall Dec. 22, 1959  J. W. WESTPHALL  2,917,908
TRANSMISSION TURNING TOOL
Filed April 18, 1958  2 Sheets-Sheet 2
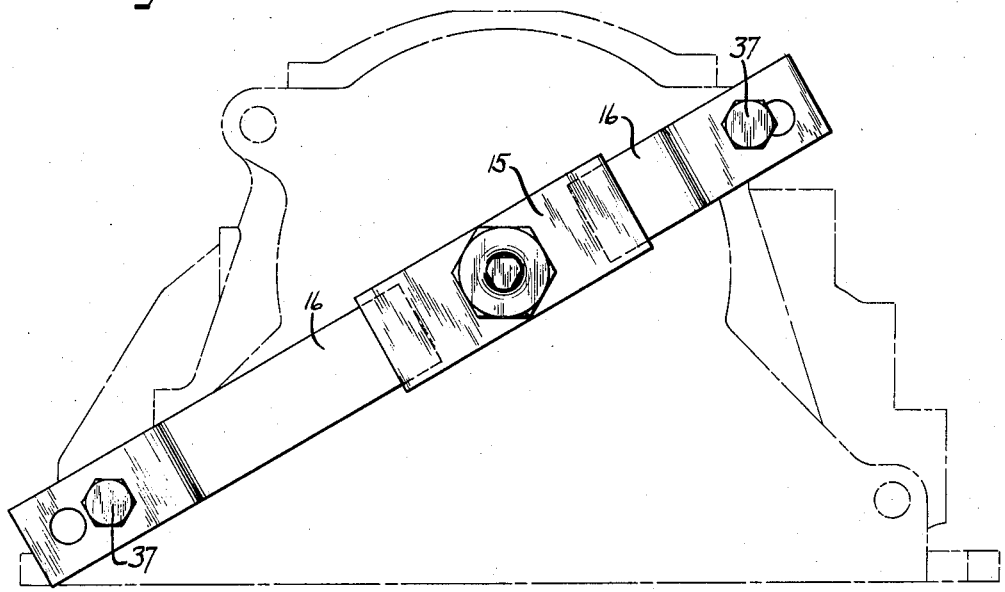
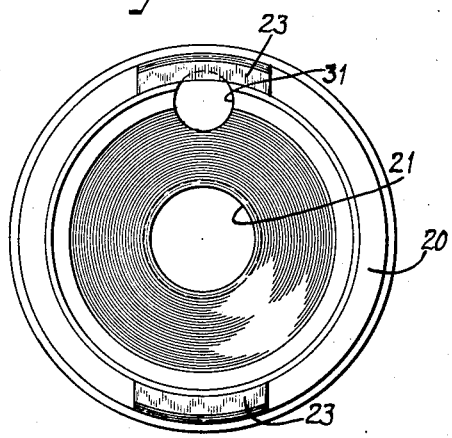
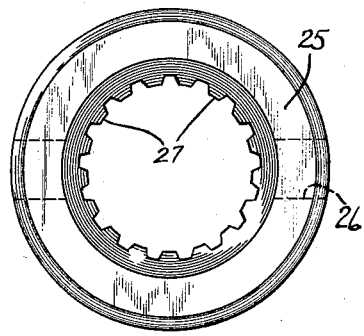
Inventor
James W. Westphall
by Hill, Sherman, Meroni, Gross & Simpson Attys

United States Patent Office 2,917,908
Patented Dec. 22, 1959

2,917,908

TRANSMISSION TURNING TOOL

James W. Westphall, Buffalo, N.Y., assignor to Houdaille Industries, Inc., Buffalo, N.Y., a corporation of Michigan Application April 18, 1958, Serial No. 729,454

3 Claims. (Cl. 64—1)

This invention relates to testing machines and more particularly to a mechanism designed for testing certain parts of an operating mechanism.

It has for some time been thought that it would be highly desirable to provide a means for testing various facets of the operation of both the front and rear hydraulic pumps in a transmission or the like, while the transmission is disassociated from the power source to which it is normally connected. In certain conventional transmissions, however, the drive to the front pump is by a sleeve carried on the rear of a torque converter which extends through an oil seal.

It is a principal object of this invention to provide a transmission turning tool, for bench testing a number of the component parts of a transmission and, more particularly, for testing the proper functioning of the front and rear hydraulic pressure pumps and the associated fluid lines and passages connected therewith.

By providing a means for simulating actual operating conditions in a transmission disassociated from its normal power source the proper functioning of both the front and rear hydraulic pumps may be adequately tested. Furthermore, it may be ascertained whether or not there is proper pressure in all the manual valve positions at closed throttle and that there is a proper pressure rise in the hydraulic lines within the transmission upon an advance in throttle speed. Also, leakage or obstruction in feeder lines and passages, leakage or malfunctioning of the central valve body or valves, and external leakage of seals, gaskets and other component parts of the transmission as oil is agitated and the output shaft is rotated may be satisfactorily ascertained through the use of this device.

These and other objects of the invention will become apparent from time to time as the following specification proceeds with reference to the accompanying drawings wherein:

Figure 1 is a fragmentary vertical sectional view through applicant's device showing some parts in section and others in side elevation and showing the device operatively connected to a fragmentarily illustrated transmission;

Figure 2 is a plan view of applicant's device mounted on the forward end of a transmission;

Figure 3 is an end view of the outer sleeve of applicant's device showing the sleeve with all of the interior component parts removed;

Figure 4 is a plan view of a spline adapter for applicant's novel device constructed in accordance with the present invention; and Figure 5 is a fragmentary view of the inner end of the drive sleeve of the turning tool which is arranged to connect with the front oil pump of the transmission.

Many types of automatic transmissions have a pair of pumps separately driven through concentric drive shafts. The present invention relates to a device which can drive both of such pumps when such a transmission has been disassociated from its normal source of power for the purpose of testing the pumps and other components of the transmission. A transmission turning tool employing the novel features of the present invention is shown in the drawings. As illustrated a transmission 10 of a conventional type has an outwardly extending fixed sleeve 11 surrounding a drive shaft 12 which extends to the main drive of the transmission and ultimately to the rear pump. The front oil pump of the transmission is diagrammatically indicated at 34 and is driven through a connector 35 which lies to the rear of the oil seal 36.

In providing a transmission turning tool which will drive both the pumps, it is necessary to provide a drive connection to the shaft 12 as well as to provide some means which will extend through the oil seal 36 into driving engagement with the drive member 35 of the front oil pump 34. Referring particularly to Figure 1 of the drawing, a transmission turning tool employing the novel features of the present invention is shown as having a mounting bracket or strap 15 having legs 16 which may be secured in any conventional manner such as indicated at 37 to the transmission housing. The main body portion of the support or bracket 15 has a central aperture within which is positioned a bushing 17 which is arranged to rotatably receive a power coupling shaft 18. The power shaft 18 is preferably hexagonally or otherwise non-circularly shaped at its outer end to facilitate a driving connection with a suitable power source. The inner end 19 of the shaft 18 is threaded or otherwise arranged to have a sleeve 20 rigidly secured thereto. As shown, the sleeve 20 is provided with an end wall having a threaded aperture 21 therein for receiving a threaded inner end 19 of the shaft 18. The sleeve 20 in a turning tool is arranged to replace the customary tubular drive shaft for the torque converter (not shown) to the drive member 35 of the front oil pump 34. As may be seen in Figures 3 and 5 of the drawings, the inner end of the sleeve 20 is provided with ears 23 for driving connection with the complimentary portion (not shown) on the drive member 35 and the oil pump 34.

It will further be noted, with particular reference to Figures 1 and 4, that a splined adapter 25 having a pair of diametrically opposed radial slots 26 is adapted to be positioned within the hollow sleeve 20 in such a manner that the splined teeth 27 about the inner diameter thereof drivingly engage the longitudinally directed splines 13 on the outer end of the input shaft 12 of the transmission 10. It will further be noted that a drive pin 30 is positioned within an aperture 31 in the forward end of the hollow sleeve 20 and that the drive pin 30 is arranged to extend into one of the radial slots 26 in the splined adapter 25 to drivingly engage the same. The drive pin 30 is maintained in its proper position by its interference fit in aperture 31 in the forward end of the hollow sleeve 20 and is so fixed that the forward end is flush with flange 33 and the rearward end protrudes into slot 26 in splined adapter 25.

It will now clearly be understood that a transmission turning tool has been provided in which some suitable source of power, such as a ½" electric drill motor or the like, may be connected to the input end of the power shaft 18 to drive both the main drive shaft 12 of the transmission as well as the front oil pump. By employing a plurality of collars 25 of different sizes and spline arrangements, a number of different types of transmissions may be tested with the same turning tool.

It will here be understood that this embodiment of the invention has been used for illustrative purposes only and that various modifications and variations of the present invention may be effected without departing from the novel spirit and scope of the concepts thereof.

I claim as my invention:

1. A torque transmission assembly for turning a rotatable element and a concentrically aligned splined shaft journaled within a housing, wherein the rotatable element has engagement means thereon comprising; a mounting member, an internally splined first sleeve rotatably mounted on said member and engageable with the splines on said shaft to rotate said shaft, a second sleeve mounted concentrically with said first sleeve on said member, and complementary engagement means on said second sleeve cooperable with the engagement means on the rotatable element to transmit rotary motion thereto, and means for rotating said sleeves.

2. A torque transmission assembly for turning a rotatable element and a concentrically aligned splined shaft journaled within a housing, wherein the rotatable element has engagement means thereon, comprising; a mounting member, an internally splined first sleeve rotatably mounted on said member and engageable with the splines on said shaft to rotate said shaft, a second sleeve mounted concentrically with said first sleeve on said member, means for mounting said second sleeve on said first sleeve for corotatable movement therewith, complementary engagement means on said second sleeve cooperable with the engagement means on the rotatable element to transmit rotary motion thereto, and means for rotating one of said sleeves.

3. A torque transmission assembly for turning a rotatable element and a concentrically aligned splined shaft journaled within a housing, wherein the shaft protrudes from the rotatable element and wherein the rotatable element has engagement means thereon, comprising a mounting member mountable on the housing, an internally splined first sleeve engageable with the splines on the shaft to transmit rotary motion to the shaft, a second sleeve rotatably mounted on said member, means for removably securing said first sleeve within said second sleeve for corotatable movement therewith, complementary engagement means on said second sleeve cooperable with the engagement means on the element to transmit rotary motion thereto, and means for rotating said second sleeve.

References Cited in the file of this patent

UNITED STATES PATENTS

| | | |
|---|---|---|
| 2,062,293 | Cashman | Dec. 1, 1936 |
| 2,374,207 | Jackson | Apr. 24, 1945 |